3,549,338
WELDING WIRE
Jury Alexandrovich Sterenbogen, Ul. Kurskaya 8, kv. 11; Viktor Fedorovich Khorunov, Ul. Sapernoe pole 28, kv. 44; Jury Yakovlevich Gretsky, Ul. Vernadskogo 65, kv. 121; and Nikolai Konstantinovich Bizik, Ul. Geroev Sevastopolya 23, kv. 6, all of Kiev, U.S.S.R.; and Boris Georgievich Ivanov, Ul. Yablochkova 20, korpus 2, kv. 22; Lev Alexandrovich Avchin, Ul. Gorkogo 28, kv. 88; Alexei Vasilievich Molchanov, Ul. Klimashkina 14, kv. 49; and Jury Isaakovich Zhuravitsky, Kapelsky per. 1, kv. 3, all of Moscow, U.S.S.R.
No Drawing. Filed Dec. 21, 1967, Ser. No. 692,324
Int. Cl. B23k 35/24
U.S. Cl. 29—191.2         1 Claim

ABSTRACT OF THE DISCLOSURE

A welding wire consisting of a steel sheathing filled with a powdered charge. The powdered charge comprises crystalline graphite, ferrosilicium, ferromanganese, ferrotitanium, aluminum, iron scale and iron powder.

---

The present invention concerns electrode wires for welding and building up grey iron, and more particularly it concerns such electrode wires as are provided with a steel sheathing filled with a powdered mixture.

The present invention may be used to the best advantage when repairing large defects (with the area of welding metal exceeding 50 cm.$^2$) on surfaces of grey-iron castings to be machined or those which are already machined.

Known in the prior art are electrode wires for welding and building up grey iron, provided with a steel sheathing filled with a powdered charge including graphite, ferrosilicium, ferromanganese, ferrotitanium, aluminum and iron powder (see, for example, U.S.S.R. Author's Certificate No. 163,687.

The coating charge of this electrode wire contains, in wt. percent.

| | |
|---|---|
| Graphite | 5.8–7.5 |
| Ferrosilicium | 3.7–6.0 |
| Ferromanganese | 0.5–1.3 |
| Ferrotitanium | 1.45–3.0 |
| Aluminum | 0.4–2.5 |
| and | |
| Iron Powder | 1.2 | of the total weight of the welding wire.

These welding wires are employed for welding and building up under a protective atmosphere of carbon dioxide or without any protection at all, with moderate preheating of articles up to 400° C. or without preheating at a slow rate of feed of the welding wire averaging 80 to 300 m./hr. and a low current intensity of 240 to 550 amp.

To prevent the formation of chilled structures in the welded seam and on the fusion zone boundary, these conventional welding wires are provided with a great number of graphitizing additions, such as carbon, silicon, etc., contained in the graphite, ferrosilicium and other charge constitutents.

The solidification of small-size welding pools occurs under conditions of fast cooling rates. This accounts for the impossibility of ensuring the complete running of reactions for the formation of grey iron in layers of weld metal from powdered constituents of the welding wire, as well as the stability of chemical composition of the weld metal, uniformity of structure and color of the welded joint. The weld metal and metal along the boundary of the fusion zone differ from the base metal in respect of hardness by as much as 40 to 60 units of Brinell hardness.

Moreover, as a result, there are created unfavorable conditions of heat exchange between the welding heat and the mass of the article, which results in the formation of hardened interlayers in the weld metal and a concentration of stresses in the zone of heat diffusion.

It appears from the above that said welding wires are capable of effecting welding and building up of small surfaces of iron castings amounting up to 50 cm.$^2$, which are not specified to meet high requirements as to their structure uniformity, stability of chemical composition, and hardness uniformity both in the layers of the weld metal and those of the base metal.

Practice has shown that in many cases it is absolutely necessary to perform welding and building up of large surfaces of iron castings, reaching up to 50 to 100 cm.$^2$ in area and even larger, while there are simultaneously specified rigid requirements as to the stability of the chemical composition of the weld metal, uniformity of structure and color of the welded joint and uniformity of its hardness values; it may be also required that the weld metal and base metal should differ in their respective hardnesses by a value not exceeding 10 to 20 Brinell hardness units.

To meet all these requirements, it is necessary to carry out the welding and building up of cast iron by providing a welding pool of large volume in which are available favorable conditions for ensuring the completion of oxidation reduction reactions between the constituents of the welding wire being melted, degassing of the welding puddle and obtaining of the required structure and hardness of the weld metal.

The welding pool of large volume can be obtained only when performing hot welding, wherein the article to be welded is partially or entirely preheated up to a temperature of 500 to 650° C. The process of welding and building up is thereby carried out while using current of high intensity, averaging 700 to 2000 amps, and fast rates of feed of the welding wire amounting to as much as 300 to 900 m./hr. Under these conditions of the welding and building-up processes, great difficulties are experienced when using carbon dioxide as a protective gas atmosphere.

The use of conventional welding wires for hot welding proved to be ineffective as a result of the fact that these welding wires contain in their coating charge, as has been indicated above, a great number of so-called graphitizing elements. Under conditions of hot welding, these graphitizing elements produce high-melting, viscous slags, interfering with the welding and building up, and making it impossible for part of the graphite carbon to interact with the welding pool. Graphitization processes set up fields of coarse lamellar graphite, impairing the mechanical properties of the weld metal.

An object of the present invention is to eliminate the above-said disadvantages.

Another object of the present invention is to provide a welding wire for welding and building up grey iron, which ensures the stability of the chemical composition of the weld metal.

A further object of the present invention is to provide a welding wire of such a type, which will ensure uniformity of structure and hardness of the weld metal throughout the entire cross section of the welded joint.

A still further important object of the invention is to provide a welding wire of said type, which will enable welding and building up without having recourse to the provision of an additional protective gas atmosphere.

In conformity with said and other objects, a welding wire for welding and building up grey iron is provided with a steel sheathing filled with a powdered charge containing graphite, ferrosilicium, ferromanganese, ferrotitanium, aluminum and iron powder; according to the invention, the powdered coating charge contains, in addition to the above-said constitutents, also iron scale, while crystalline graphite is employed as the graphite.

wires 3 mm. in diameter are effected under conditions stated in the following table:

TABLE 1

| Characteristics, unit | Rate of feeding welding wire, in m./hr. | | | | |
| --- | --- | --- | --- | --- | --- |
| | 363 | 453 | 590 | 700 | 900 |
| Current intensity, amp | 720–800 | 900–1,000 | 1,100–1,200 | 1,500–1,600 | 1,800–1,900 |
| Maximum area of welding pool, cm.² | 60 | 80 | 100 | 120 | (¹) |
| Welding arc voltage, v | 55–45 | 55–45 | 55–45 | 55–45 | 55–45 |
| Rate of deposition of filler metal, kg./hr | 8–10 | 12–15 | 18–200 | (²) | (³) |

¹ 120 and more.  ² Up to 25.  ³ Up to 30.

The most favorable solution to the problem is achieved as a result of the fact that the powdered coating charge of the proposed welding wire contains, in wt. percent (in relation to the welding wire weight):

Crystalline graphite _____ 4.2–5.2
Ferrosilicium _____ 4.0–5.0
Ferromanganese _____ 0.6–1.0
Ferrotitanium _____ 0.6–1.0
Aluminum _____ 0.1–0.3
Iron scale _____ 0.6–0.9
Iron powder _____ 0–16.0

The proposed welding wire ensures, with any method of carrying out the welding and building-up processes employed, good stability of the chemical composition of the weld metal, uniformity of its structure and hardness throughout the entire cross section of the welded joint, and allows welding and building up to be carried out without having recourse to the provision of an additional protective gas atmosphere.

The nature of the present invention will become more fully apparent from a consideration of the following description of exemplary embodiments thereof.

The proposed welding wire is provided with a steel sheathing filled with a powdered coating charge containing, in conformity with the invention, in addition to graphite, ferrosilicium, ferromanganese, ferrotitanium, aluminum and iron powder, also iron scale, while crystalline graphite is employed as the graphite.

Iron scale, included into the coating charge composition, is an unstable iron oxide which dissociates in the welding arc zone, thereby giving off free oxygen. This fact accounts for the completion of the oxidation-reduction processes in gas, slag and molten metal phases of the welding pool.

The presence of crystalline graphite in the welding wire coating charge, being of an obvious crystalline structure, contributes in the presence of iron scale to a considerable oxidation of graphite carbon in the welding arc zone, and is conducive to the formation of carbon oxides, such as $CO$ and $CO_2$. In the high-temperature zone, that is, in the welding arc zone, these oxides are active deoxidizers, while at the welding process temperatures, that is, at the temperature of the welding pool metal, they enable reactions involving passing of carbon into the welding puddle.

In this connection, it presents the greatest advantages to employ a welding wire containing in the composition of the powdered charge coating constituents in the following ratios (in relation to the total weight of the welding wire):

Crystalline graphite _____ 4.2–5.2
Ferrosilicium _____ 4.0–5.0
Ferromanganese _____ 0.6–1.0
Ferrotitanium _____ 0.6–1.0
Aluminum _____ 0.1–0.3
Iron scale _____ 0.6–0.9
Iron powder _____ 0–16.0

Welding and building up with the use of these welding

To form the welding pool of large volume in the building-up process, there is employed a refractory clay of the following composition (in wt. percent):

Quartz sand _____ 20
Semi-fat quartz sand _____ 20
Fireclay _____ 5
Graphite _____ 50
Dextrine _____ 5

This composition is mixed up with water so as to obtain the state of hard dough.

EXAMPLE 1

A defect in a grey-iron casting having an area of 110 cm.² was built up with the aid of a large-volume welding pool with the use of a welding wire containing in the powdered coating, charge constituents in the following proportions in relation to the total weight of the welding wire:

Crystalline graphite—4.6; ferrosilicium—4.6; ferromanganese—0.8; ferrotitanium—0.8; aluminum—0.2; iron scale—0.7; iron powder—15.0.

The casting was preheated to a temperature of 550° C. Preheating was effected in a gas-fired hearth.

The contour of the defect was lined with fire-clay of the above-mentioned composition.

Building up was effected with a rate of feed of the welding wire equal to 700 m./hr. and current intensity of 1500 amp.

The weld metal thus obtained is characterized by the following values:

Chemical composition: carbon=3.26; silicon=2.90; manganese=0.98; phosphorus=0.12; sulphur=0.05; chromium=0.10; titanium=0.09; aluminum=0.30.

Hardness values: the hardness of the base metal amounts to 183 Brinell units; the hardness of the fusion zone amounts to 197 Brinell units; the hardness of the weld metal, 187 Brinell units.

Good machinability.

Structure: graphite in the form of isolated and randomly oriented inclusions from 25 to 60 microns long.

The base metal: sorbitic pearlite composed of fine lamellae.

EXAMPLE 2

A defect having an area of 90 cm.² in a grey-iron casting was built up with the aid of a large-volume welding pool by using a welding wire containing in its powdered coating charge constituents in the following proportions in relation to the total weight of the welding wire:

Crystalline graphite—4.3; ferrosilicium—4.2; ferromanganese—0.60; ferrotitanium—0.60; aluminum—0.1; iron scale—0.6; iron powder—10.0.

The casting was preheated to a temperature of 500° C. Preheating was effected in a furnace.

The contour of the defect was lined by fire-clay of the above-mentioned composition.

Building up was effected with a rate of feed of the welding wire equal to 590 m./hr. and current intensity of 1200 amp.

The weld metal thus obtained is characterized by the following values:

Chemical composition: carbon=3.2; silicon=2.7; manganese=0.97; phosphorus=0.13; sulphur=0.05; chromium=0.10; titanium=0.1; aluminum=0.40.

Hardness: the hardness of the base metal amounts to 187 Brinell units; the hardness of the fusion zone amounts to 193 Brinell units; the hardness of the weld metal, 193 Brinell units.

Good machinability.

Structure: graphite in the form of fine and randomly oriented inclusions from 25 to 60 microns long.

The base metal: sorbitic pearlite composed of fine lamellae.

EXAMPLE 3

A defect having an area of 120 cm.$^2$ in a grey-iron casting was built up with the aid of a welding wire containing in the powdered coating charge constituents in the following proportions, taken in percent by weight in relation to the total weight of the welding wire employed.

Crystalline graphite—5.10; ferrosilicium—4.90; ferromanganese—0.90; ferrotitanium—0.90; aluminum—0.30; iron scale—0.90; iron powder—16.0.

The casting was preheated to a temperature of 600° C. Preheating was effected in a gas-fired hearth. The contour of the defect was lined by fire-clay of the above-said composition.

The building up was effected with a rate of feed of the welding wire equal to 900 m./hr., while the current intensity was 1800 amp.

The weld metal thus obtained is characterized by the following values.

Chemical composition: carbon=3.4; silicon=3.1; manganese=0.98; phosphorus=0.14; sulphur=0.05; chromium=0.09; titanium=0.1; aluminum=0.2.

Hardness values: the hardness of the base metal amounts to 187 Brinell units; the hardness of the fusion zone amounts to 178 Brinell units; the hardness of the weld metal, 173 Brinell units.

Good machinability.

Structure: graphite in the form of isolated and randomly oriented inclusions from 25 to 80 microns long. Metal base: sorbitic pearlite composed of fine lamellae.

What is claimed is:

1. A welding wire consisting of a steel sheathing filled with a powdered coating charge which comprises in percent by weight based on the total weight of the welding wire:

| | |
|---|---|
| Crystalline graphite | 4.2–5.2 |
| Ferrosilicium | 4.0–5.0 |
| Ferromanganese | 0.6–1.0 |
| Ferrotitanium | 0.6–1.0 |
| Aluminum | 0.1–0.3 |
| Iron scale | 0.6–0.9 |
| Iron powder | 0–16.0 |

References Cited

UNITED STATES PATENTS 3,370,931  2/1968  Blink _____ 29—191.2X

FOREIGN PATENTS 1,436,871  3/1966  France _____ 29—191.2

ALLEN B. CURTIS, Primary Examiner